United States Patent [19]

Kane

[11] Patent Number: 5,654,538
[45] Date of Patent: Aug. 5, 1997

[54] OPTICALLY ADDRESSED GENERAL PURPOSE PROGRAMMABLE LOGIC DEVICE

[75] Inventor: Jonathan S. Kane, Somerville, Mass.

[73] Assignee: The United States of America as represented by the Secretary of the Air Force, Washington, D.C.

[21] Appl. No.: 549,358

[22] Filed: Oct. 27, 1995

[51] Int. Cl.$^6$ .................................................. H09G 3/34
[52] U.S. Cl. ............................. 250/214 R; 250/214 LA; 364/713
[58] Field of Search .......................... 250/201.9, 214 R, 250/214 LA, 229, 216; 359/290, 291, 107, 108; 364/525, 713; 345/85, 205; 347/239

[56] References Cited

U.S. PATENT DOCUMENTS

| | | | |
|---|---|---|---|
| 4,821,222 | 4/1989 | Arrathoon | 364/713 |
| 4,941,735 | 7/1990 | Moddel et al. | 250/214 LA |
| 5,510,824 | 4/1996 | Nelson | 347/239 |
| 5,530,482 | 6/1996 | Gove et al. | 348/441 |
| 5,548,301 | 8/1996 | Kornher et al. | 345/85 |

Primary Examiner—Edward P. Westin
Assistant Examiner—John R. Lee
Attorney, Agent, or Firm—Robert L. Nathans

[57] ABSTRACT

An array of pairs of photodetector elements is provided, where each pair intercepts a set of angularly separated light beams for each pixel, and an array of electrical logic circuits coupled to the photodetector elements, each change the polarization state of liquid crystal pixel SLM portions adjacent thereto, depending upon the intensity and presence of the light beams in each set of light beams. Thus, various Boolean logic functions may be performed at very high speeds without the need for numerous input and output electrical data transmission connections to and from the processor board supporting the SLM. This operation is facilitated by an array of microlenses affixed to the SLM for maintaining the separation of the write beams and readout beam of each set of light beams for each pixel.

33 Claims, 2 Drawing Sheets

OPTICALLY ADDRESSED GENERAL PURPOSE PROGRAMMABLE LOGIC DEVICE

STATEMENT OF GOVERNMENT INTEREST

The invention described herein may be manufactured and used by or for the Government for governmental purposes without the payment of any royalty thereon.

Spatial light modulators have been indispensable tools for investigating optical signal processing algorithms and more recently have been the bases for analog optical processors. The current generation of spatial light modulators (SLMs) usually consist of some form of detector, either electronic or optical, coupled with a modulator. The detector receives the information and then either displays a simple threshold of that signal, as is the case in binary modulators, or a transmittance related to the analog value. Any complicated processing is usually accomplished by porting the information to a host serial computer. The problem with this approach is that the time it takes to accomplish the serial I/O and processing often negates the benefits offered by the optical implementation. This is especially cumbersome in the case of algorithms that depend on parsing the input information on a pixel by pixel basis.

For this reason, there has been interest in developing the use of on-board processing on a pixel by pixel basis for a spatial light modulator. These so-called "Smart Spatial Light Modulators" allow the information to be received optically, processed on-chip and then ported off optically.

As noted in numerous texts, one of the more common models of digital computation is the classical finite state machine, which consists of a logic unit that passes its results iteratively through parallel feedback paths. In order to reduce the number of necessary interconnections, Von Neumann constructed an architecture where each feedback path is given a distinct location in memory. The penalty for the resulting reduced number of wires is that each location must be addressed serially. This has been enormously successful as is evident in the current computer market, but as computers have reached record speeds, other methods of reducing the processing time have come under examination. This has resulted in research design to get around the restrictions placed by the now famous "Von Neumann" bottleneck.

The optical community has been especially interested in this area since optical interaction appears to be an ideal medium for processing information on parallel paths. Thus different optical architectures have been proposed, such as the S-SEED device type; see M. E. Prise, N. C. Craft, M. M. Downs, R. E. LaMarche, L. A. D'Asaro, L. M. F. Chirovsky, and M. J. Murdocca, "Optical digital processor using arrays of symmetric self-electrooptic effect devices", Applied Optics, 30, 2287–2296 (1991) or the matrix based optical computer type; see P.S. Guilfoyle, "Digital Optical computer fundamentals, implementation, and ultimate limits", SPIE Proc. 1214–15, (1990). It is generally recognized that these types of optical architectures are restricted to cases where the application requires a large number of interconnects, otherwise the size, speed, switching energy and power of present state-of the art digital computers is superior than the equivalent existing optical systems.

BRIEF SUMMARY OF PREFERRED EMBODIMENTS OF THE INVENTION

A array of pairs of photodetector elements, each pair associated with a liquid crystal (LC) pixel portion of an SLM, intercepts a set of angularly separated light beams for each pixel, and an array of electrical signal subtracting circuits or logic devices cause the polarization of LC readout light to be switched or unswitched depending upon the presence and intensities of the input light beams of each pixel set. An array of microlenses, each microlens associated with a corresponding pixel portion, maps the angular light beam separation to translation. Thus each input read/write beam physically maps to a different portion of the pixel which enables the processor to perform numerous Boolean logic functions in parallel at very high speeds. The microlenses also produce a good contrast ratio and provide land area on the LC backup board to enable placement of the beam photodetector elements and the threshold devices used to switch the LC pixel polarization states to perform the logic functions. The logic devices are coupled solely between the photodetector elements and the threshold devices of the LC pixel portions of the SLM to eliminate the need for numerous input and output electrical data transmission connections to and from the processor board so as to save manufacturing costs.

BRIEF DESCRIPTION OF THE DRAWINGS

Other features, aspects and advantages of the invention will become more apparent upon study of the following detailed description taken in conjunction with the drawings in which.

DETAILED DESCRIPTION OF PREFERRED EMBODIMENTS OF THE INVENTION

Figure 1:
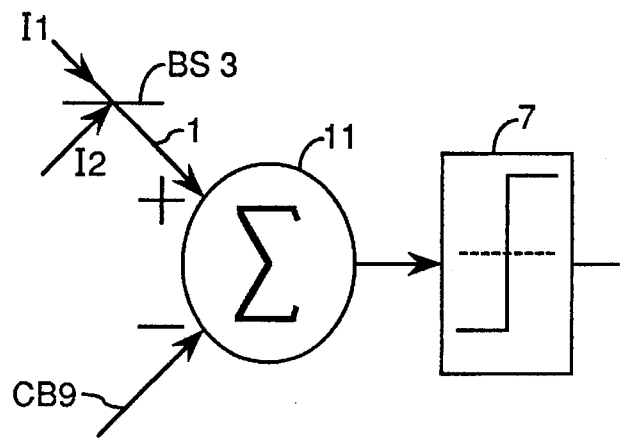
FIG. 1 illustrates a key aspect of the invention.

An aspect of the invention is schematically illustrated in FIG. 1, wherein an OR function can be produced where either input light beam I1 or I2 directed at beamsplitter BS 3 is present. Light detecting logic element 11, functioning as an algebraic adder, can produce, for example, a plus one voltage signal if only one input beam is present, whereas a plus two voltage level can be produced where both input light beams I1 and I2 are present, due to the increased light intensity. Either voltage level will trigger threshold device 7, which could apply an changed electric field across an SLM pixel portion, to in turn alter the polarization of readout light passed through the pixel portion. Regarding an AND function, a control light beam CB9 can cause a minus one voltage signal to be produced. Now, if only one input beam is present to produce a plus one voltage level, this will be insufficient to trigger threshold device 7, since one volt will be subtracted by light detecting logic element 11 from the plus one signal produced by the single input light beam. However, if a plus two signal is produced by the presence of both input beams I1 and I2, a net plus one voltage level will be applied by light detecting logic element 11 to threshold device 7 to cause it to change the state of the associated SLM pixel portion.

Figure 2:
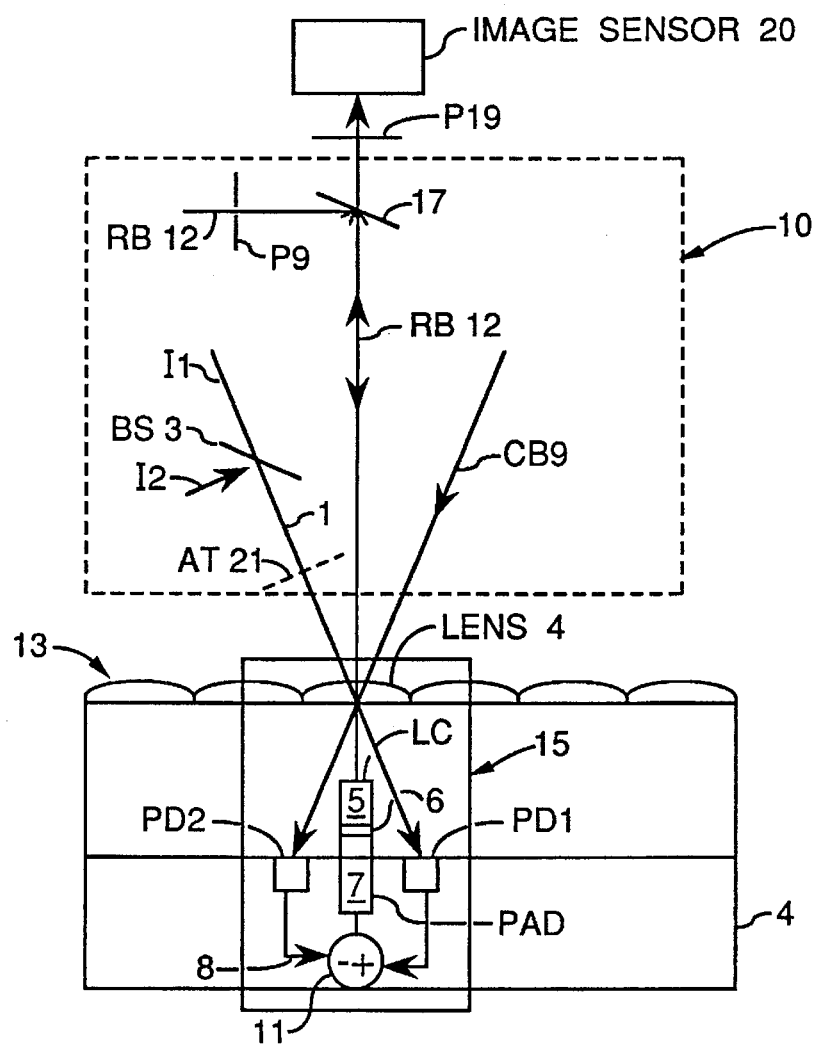
FIG. 2 illustrates a preferred embodiment of the invention for executing AND and OR functions.

As shown in FIG. 2, a light beam generator 10 directs the aforesaid input beams I1 and I2 at a photodetector element PD1 via BS 3, and microlens 4 of lens array 13. The presence of input beams I1 or I2 will cause PD1 to apply a plus one or plus two voltage level to logic device or subtractor 11, as previously mentioned. An SLM having liquid crystal pixel portions LC5 is positioned between microlens array 13 and the array of photodetector means 8, each of which includes PD1 and PD2, coupled to the positive and negative terminals of subtractor 11 as shown. Light beam generator 10 also directs control beam CB9 at PD2 via microlens 4 to enable the AND function as mentioned above. Thus the subtractor 11 applies a voltage level to modulator pad 7 which functions as the aforesaid threshold device which in turn applies an electrical signal across LC5 to change the polarization state thereof. Alternatively, light from CB9 can be omitted entirely and I1 and I2 attenuated such that both beams are needed to cause threshold device 7 to change the state of the associated pixel portion.

If the OR function is desired, the control beam CB9 is not applied to PD2, and either input beam I1 or I2 will cause subtractor 11 to apply a positive voltage to modulator (thresholding) pad circuit 7, to in turn apply a changed electrical field across the LC SLM pixel portion 5. At this time, readout beam RB12 is passed through LC 5 via polarizer P9 and BS 17, and its polarization state is switched and can be detected by image sensor 20 via beamsplitter 17 and polarization analyzer P19. If no input light beam is detected by PD1, the electrical field change signal is not applied to LC5 and thus no change of state is produced in LC5 and no change in the polarization of readout beam RB12 is detected by image sensor 20. Mirror 6 reverses the direction of light passed downwardly through LC5, and can be electrically conductive to assist in impressing the electrical polarization control field across LC5, as is well understood in the art.

If the AND function is desired, control beam CB9 is directed at PD2 via microlens 4 and the aforesaid negative signal is matched against the plus one or plus two signal produced by PD1. If only one input light beam is detected by PD1, the plus one voltage level (for example) would be canceled by the minus one level produced by PD2 due to the detection of the control beam and the electric field across LC5 remains the same. However, if both beams are present, the resulting higher voltage level produced by PD1 will overcome the negative PD2 signal to a sufficient extent to enable thresholding pad 7 to produce a change of state of LC5. This is one way to produce the AND function. Another way is to optionally provide attenuator AT21 as shown, which would cause the voltage level produced by PD1 to overcome a negative signal applied to 11, needed to change the LC state, only if both I1 and I2 were applied to the attenuator. Hence, the AND function can be enabled by providing a variable intensity write beam 1.

It should now be understood that PD1 and PD2 together form a photodetector means 8 for controlling subtractor 11 which in turn controls the light polarizing state of LC5, via the electrical thresholding circuit pad 7. Subtractor 11, which may be termed an algebraic adder, thus functions as a logic circuit for altering the light polarizing states of the SLM pixel portion or LC5 in accordance with the input light beams applied to the photodetector elements PD1 and PD2. These components are shown within pixel portion 15 in the figure, and coact with associated microlens 4 of lens array 13. The processor of the invention, employs arrays of the SLM pixel portion 15 with its described components, such arrays typically being two-dimensional and having thousands of pixel portions therein. Typically, there would be M×N microlenses, and M×N associated pixel portions 15, each pixel portion including the components therein illustrated in FIG. 2, where M and N are substantial integers such as 512, 1024 or greater. Two-dimensional M×N arrays of LEDs could be employed within the light beam generator 10 and two-dimensional CCD light intensity sensors would be employed by image sensor 20 for readout as described above. Linear arrays of all of these components may of course also be employed.

An array of microlenses, each microlens associated with a corresponding pixel portion, maps the angular light beam separation to translation. Thus each input read/write beam physically maps to a different portion of the pixel which enables the processor to perform numerous Boolean logic functions in parallel at very high speeds. Hence, as the input beam approaches the lens 4 at a steeper angle, the resulting spot produced by the lens moves outward to the edge of the pixel. The array 13 of microlenses are preferably rigidly coupled to the array of photodetectors, to maintain the alignment of individual microlenses with associated photodetectors, to in turn maintain the separation of angularly separated beams of each set of beams directed at each photodetector means. This angular beam separation provides the basis for the aforesaid logic operations and the control and readout of the binary polarization states of the SLM pixel portions by the readout beam RB12. It is another important feature of the invention that the logic devices 11 are electrically coupled solely between the photodetectors and the LCD pixel portions, thereby to eliminate the need for numerous undesirable input and output electrical data transmission connections to and from circuit board 4.

Figure 3:
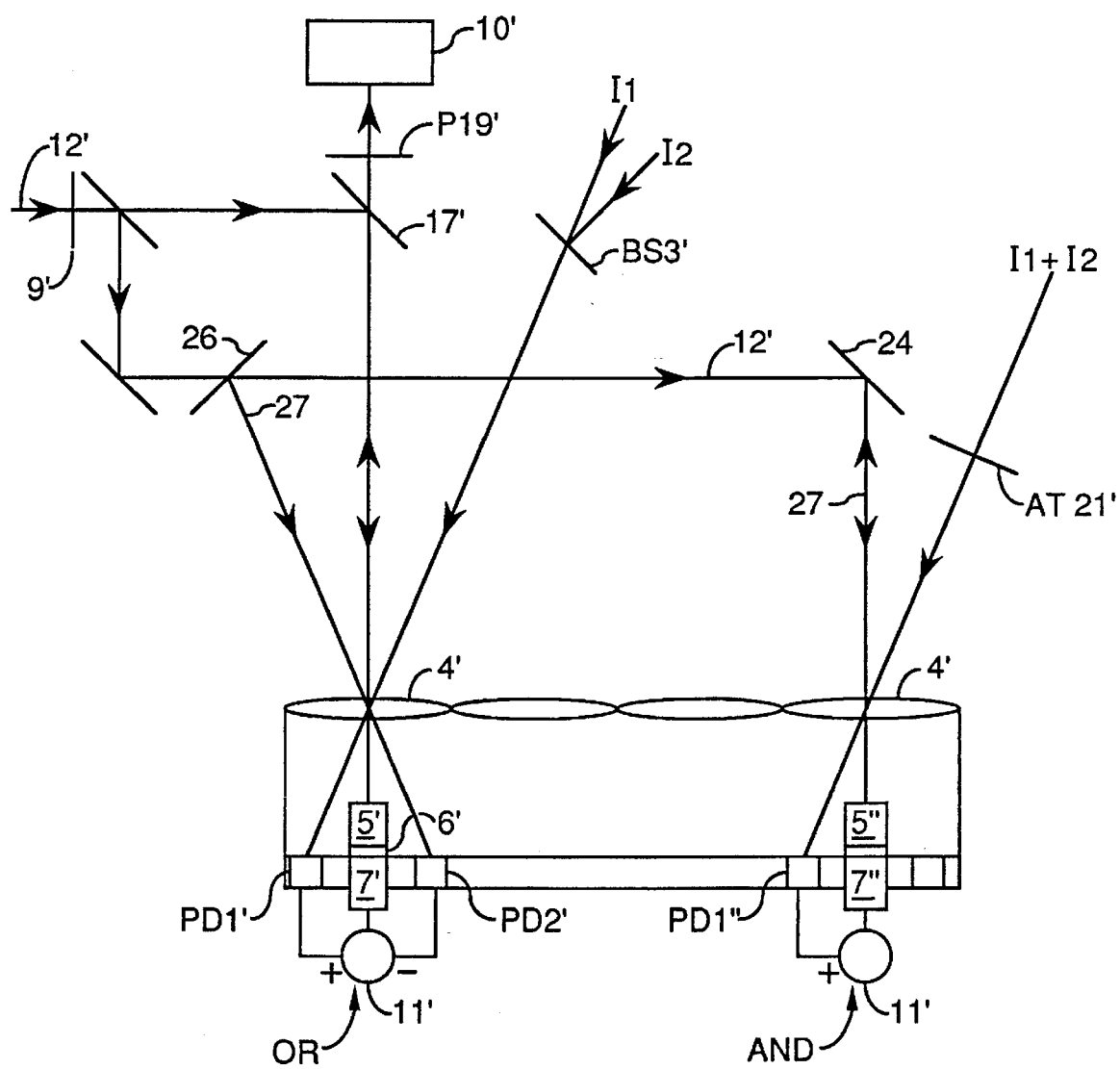
FIG. 3 illustrates an embodiment of the invention for executing an exclusive XOR function.

The present invention is readily adapted to performing the exclusive OR function XOR. Almost all of the components shown in FIG. 3 have counterparts in FIG. 2 and thus have been primed accordingly. The OR function is carried out by the left hand unit OR in the manner described previously. The OR function can be inhibited or disenabled by the right hand AND circuit which upon detection of the AND condition, prevents the OR circuit from changing the state of the pixel portion LC 5' which would otherwise occur. This enables execution of the XOR function, since an AND condition negates a change of state of LC 5, which would otherwise occur upon the detection of the OR condition. More specifically, the presence of either I1 or I2 at BS 3', results in the projection of a light beam upon PD1' which would produce the OR condition, as described. However, the presence of both I1 and I2 results in the projection of a sufficiently intense light beam through AT21' at PD1" at the right hand portion of the figure, which would operate threshold device 7' to alter the state of LC5". This action results in the feedback of beam 27 via 24 and 26 to actuate PD2'. The resulting negative signal at subtractor 11' will prevent the thresholding of 7' which would otherwise be produced due to the positive signal produced by one or more light beams striking PD1'. Note that attenuator AT 21' initiates the AND condition only if both I1 and I2 are present, which results in the projection of beam 27 upon PD2'. The XOR readout beam 12' passes through LC5' and BS 17' as before to be detected by image sensor 10'.

A proof of concept prototype including a small 10×14 pixelated device was constructed for carrying out the above described functions. A ferroelectric binary SLM, manufactured by Displaytech Inc., of Boulder, Colo., was employed. This SLM advantageously combines liquid crystals with a VLSI electronic backplane that can be fabricated with standard two micron design rules. The dedicated circuitry can be designed using mature design tools and then be mated with the LC front plane. In addition, as it is a binary device by design, logic levels can be automatically recovered by controlling the intensity of the read beam.

The inverted signals NOR and NAND can be generated since the output polarization of the SLM can be switched in either of two polarizations, either of which can be in the off state. By simply switching a global electronic control signal, the on state can be either dark or light, and in this sense, OR or AND can be realized, or NOR and NAND can be realized.

While preferred embodiments of the invention have been set forth above, other variations of the foregoing will be apparent to the skilled worker in the art within the true spirit of the invention, and thus the scope of the invention is to be limited only by the terms of the following claims and equivalents thereto. For example, the aforesaid general additive and substractive circuitry could be replaced by their equivalent digital gates. Thus, to realize AND for example, a digital AND gate would be designed into the pixel A second alternative is to replace the functionality of addition with multiplication. Another conceivable alteration is to make each pixel directly configurable by adding an addressable line either optical or electronic that switches the input from OR to NOR (and AND or NAND) on a pixel by pixel basis.

The preferred embodiment was a liquid crystal based modulator that modified the polarization of the input light. However, any technology could be used which is capable of providing two distinct states. This opens up the possibility of multiple quantum well technology, bulk semiconductor, magneto-optic, vertical cavity surface emitting lasers, other types of liquid crystal, or Fabry Perot based technologies.

What is claimed is:

1. A digital optical data processor comprising:
   (a) a spatial light modulator (SLM) having an array of pixel portions for modulating light passed therethrough;
   (b) an array of photodetector means, each photodetector means being associated with a corresponding pixel portion of said SLM and having at least one photodetector element;
   (c) light beam generator means for directing a set of separated light beams at each photodetector means;
   (d) an array of microlenses, each microlens thereof being associated with a corresponding pixel portion of said SLM for maintaining the separation of beams of each set of light beams transmitted by each microlens at each photodetector means; and
   (e) an array of logic devices, each logic device thereof being coupled to an associated photodetector means, for altering the states of each SLM pixel portion in accordance with the separated light beams of each set directed upon each photodetector means by each microlens of said array of microlenses.

2. The data processor of claim 1 wherein each photodetector means includes a first and second photodetector element separated from each other for detecting said separated light beams and wherein each logic device has a first input terminal coupled to said first photodetector element and a second input terminal coupled to said second photodetector element, and an output terminal for applying a difference signal to an associated SLM pixel portion for controlling the state thereof.

3. The data processor of claim 1 wherein said light beam generator means directs a write beam at said photodetector means via an associated microlens and a read beam at an associated SLM pixel portion for reading out the state thereof.

4. The data processor of claim 2 wherein said light beam generator means directs a write beam at said photodetector means via an associated microlens and a read beam at an associated SLM pixel portion for reading out the state thereof.

5. The data processor of claim 3 wherein said light beam generator means includes means for polarizing each write beam before being directed at associated photodetector means, together with output means for detecting polarization states of read beams after they are modulated by pixel portions of said SLM.

6. The data processor of claim 4 wherein said light beam generator means includes means for polarizing each write beam before being directed at associated photodetector means, together with output means for detecting polarization states of read beams after they are modulated by pixel portions of said SLM.

7. The data processor of claim 1 wherein said light beam generator includes means for generating a variable intensity write beam.

8. The data processor of claim 1 wherein each photodetector means includes a first and second photodetector element and said light beam generator includes means for directing a variable intensity write beam at said first photodetector element and a control beam at said second photodetector element.

9. The data processor of claim 2 wherein each photodetector means includes a first and second photodetector element and said light beam generator includes means for directing a variable intensity write beam at said first photodetector element and a control beam at said second photodetector element.

10. The data processor of claim 4 wherein each photodetector means includes a first and second photodetector element and said light beam generator includes means for directing a variable intensity write beam at said first photodetector element and a control beam at said second photodetector element.

11. The data processor of claim 1 wherein each logic device applies an electrical signal to associated SLM pixel portions for altering the polarization states thereof.

12. The data processor of claim 2 wherein each logic device applies an electrical signal to associated SLM pixel portions for altering the polarization states thereof.

13. The data processor of claim 3 wherein each logic device applies an electrical signal to associated SLM pixel portions for altering the polarization states thereof.

14. The data processor of claim 4 wherein each logic device applies an electrical signal to associated SLM pixel portions for altering the polarization states thereof.

15. The data processor of claim 5 wherein each logic device applies an electrical signal to associated SLM pixel portions for altering the polarization states thereof.

16. The data processor of claim 6 wherein each logic device applies an electrical signal to associated SLM pixel portions for altering the polarization states thereof.

17. The data processor of claim 7 wherein each logic device applies an electrical signal to associated SLM pixel portions for altering the polarization states thereof.

18. A digital optical data processor comprising:
   (a) a spatial light modulator (SLM) having an array of pixel portions for modulating light passed therethrough;
   (b) an array of photodetector means, each photodetector means being associated with a corresponding pixel portion of said SLM and having at least one photodetector element;
   (c) light beam generator means for directing a set of angularly separated light beams at each photodetector means;
   (d) an array of microlenses, rigidly coupled to said array of photodetector means, for maintaining alignment of individual microlenses with associated photodetector means, to maintain the separation of beams of each set of light beams transmitted by said light beam generator means at individual photodetector means; and (e) an array of logic devices, each logic device thereof being coupled between an associated photodetector means and said SLM, for applying electric signals to said SLM for altering the states of each SLM pixel portion in accordance with the angularly separated light beams of said set of light beams.

19. The data processor of claim 18 wherein each of said logic devices are electrically coupled between associated photodetector means and SLM pixel portions.

20. The data processor of claim 19 wherein signal transmission portions of said logic devices are electrically coupled solely between said photodetector means and said SLM pixel portions, thereby to eliminate the need for input and output electrical data transmission connections.

21. A digital optical data processor module for processing spatially separated sets of light beams comprising:

(a) a spatial light modulator (SLM) having an array of pixel portions for modulating light passed therethrough;

(b) an array of photodetector means, each photodetector means being associated with a corresponding pixel portion of said SLM and having at least one photodetector element;

(c) an array of microlenses, individual microlenses thereof aligned with associated photodetector means, for maintaining the separation of beams of each set of light beams directed at individual photodetector means via said microlenses; and (d) an array of logic devices, each logic device thereof being coupled between an associated photodetector means and said SLM, for applying electric signals to said SLM for altering the states of each SLM pixel portion in accordance with the angularly separated light beams of said set of light beams.

22. The data processor of claim 21 wherein each of said logic devices are electrically coupled between associated photodetector means and SLM pixel portions.

23. The data processor of claim 19 wherein signal transmission portions of said logic devices are electrically coupled solely between said photodetector means and said SLM pixel portions, thereby to eliminate the need for input and output electrical data transmission connections to and from said module.

24. The data processor of claim 22 wherein signal transmission portions of said logic devices are electrically coupled solely between said photodetector means and said SLM pixel portions, thereby to eliminate the need for input and output electrical data transmission connections to and from said module.

25. The data processor of claim 1 wherein said logic devices comprise electrical subtraction circuits.

26. The data processor of claim 7 wherein said logic devices comprise electrical subtraction circuits.

27. The data processor of claim 19 wherein said logic devices comprise electrical subtraction circuits.

28. The data processor of claim 21 wherein said logic devices comprise electrical subtraction circuits.

29. The data processor of claim 24 wherein said logic devices comprise electrical subtraction circuits.

30. A digital optical data processor comprising:

(a) a spatial light modulator (SLM) having an array of pixel portions for modulating light passed therethrough;

(b) an array of photodetector means, each photodetector means being associated with a corresponding pixel portion of said SLM;

(c) light beam generator means for directing a set of separated light beams at each photodetector means including a variable intensity write beam and a read beam for reading out the state of an associated pixel portion;

(d) an array of microlenses, each microlens thereof being associated with a corresponding pixel portion of said SLM for maintaining the separation of beams of each set of light beams transmitted by each microlens at each photodetector means; and (e) an array of logic devices, each logic device thereof being coupled to an associated photodetector means, for altering the states of each SLM pixel portion in accordance with the separated light beams of each set directed upon each photodetector means by each microlens of said array of microlenses, and wherein each photodetector means includes a first and second photodetector element for detecting said separated light beams and wherein each logic device comprises a subtractor and signal transmission portions including a first input terminal coupled to said first photodetector element and a second input terminal coupled to said second photodetector element together with an output terminal for applying a difference signal to an associated SLM pixel portion for controlling the state thereof.

31. The data processor of claim 30 wherein said signal transmission portions of said logic devices are electrically coupled solely between the first and second photodetector elements of said photodetector means and said SLM pixel portions, thereby to eliminate the need for input and output electrical data transmission connections to and from said processor.

32. The data processor of claim 3 wherein said light beam generator includes means for generating a variable intensity write beam.

33. The data processor of claim 5 wherein said light beam generator includes means for generating a variable intensity write beam.

* * * * *